July 21, 1931.  H. E. KRANZ  1,815,717
APPARATUS FOR MEASURING VARIATIONS IN THICKNESS OF METALLIC BODIES
Filed Jan. 12, 1926

Inventor
Hermann E. Kranz
by H. A. Tatton
Att'y.

Patented July 21, 1931

1,815,717

UNITED STATES PATENT OFFICE

HERMANN ERNEST KRANZ, OF BERWYN, ILLINOIS, ASSIGNOR TO WESTERN ELECTRIC COMPANY, INCORPORATED, OF NEW YORK, N. Y., A CORPORATION OF NEW YORK

APPARATUS FOR MEASURING VARIATIONS IN THICKNESS OF METALLIC BODIES

Application filed January 12, 1926. Serial No. 80,855.

This invention relates to apparatus for measuring variations in thickness of metallic bodies, an object being to provide an apparatus of the above character for measuring metallic bodies such as sheeting, tubes and the like, in which it is difficult, if not practically impossible, to measure the variations in thickness by mechanical instruments.

In accordance with one embodiment, the invention contemplates the use of an oscillating circuit of an electron discharge device having a coil connection adapted to be applied in close proximity to the surface of the metallic body, the thickness of which is to be measured and in which the oscillator circuit is affected by variations in thickness of the metallic body, so that an indicating device or a meter in circuit therewith will show the variations in thickness.

Figure 1:
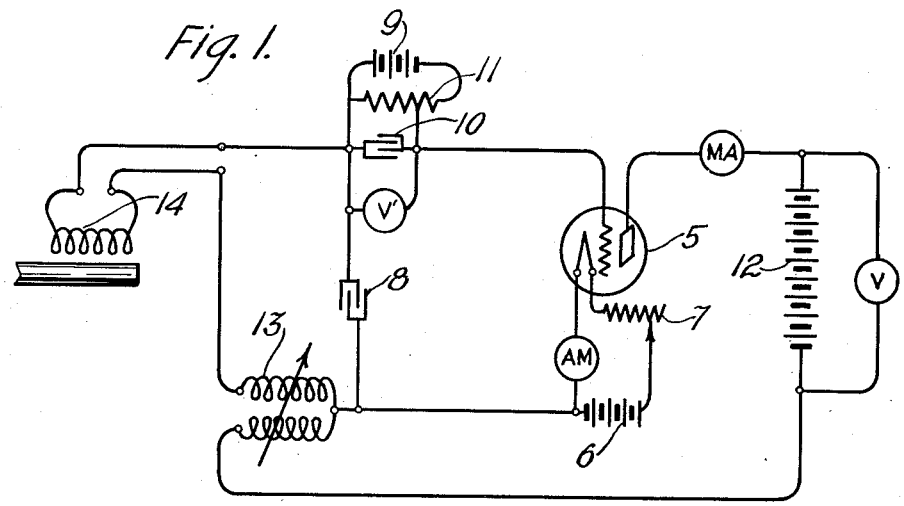
Figure 2:
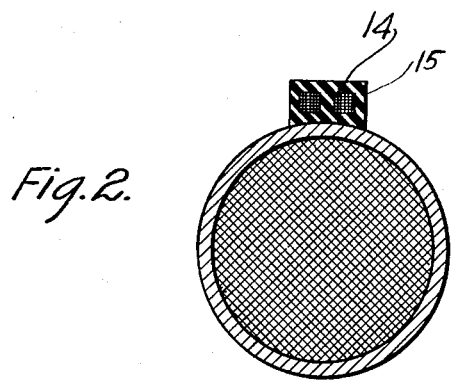

For a better understanding of the invention reference is to be had to the accompanying drawings, in which Fig. 1 is a diagrammatic view illustrating the preferred circuit arrangement of this invention; and Fig. 2 shows diagrammatically, the apparatus applied to the lead sheathing of an electric cable for measuring variations in thickness thereof during its manufacture.

Referring now to the circuit arrangement of Fig. 1, there is provided a suitable oscillating circuit and preferably of the electron discharge type in which a tuned grid oscillator circuit is used. A three element tube 5 is provided having its filament connected with a battery 6 through a suitable rheostat 7 and ammeter AM. The filament and grid elements of the tube 5 are connected to provide an oscillation circuit in the closed inductance capacity path including the condenser 8, variometer 13 and coil 14, a battery 9 being provided and connected across a condenser 10 through a potentiometer 11 to which a voltmeter V' is connected for measuring the voltage supplied. The plate electrode of the tube 5 is connected through the battery 12 to the inductance coil or variometer 13 with a suitable voltmeter V connected across the battery terminals.

For measuring purposes a measuring coil 14 has a support 15 shaped so that it may be placed in close proximity to the surface of the metallic body which is to be measured is provided. This coil is suitably connected to the oscillator circuit so as to be affected thereby, and it is preferably connected in the circuit so that the oscillating current will flow therethrough.

The shape of this coil and its support depends upon the use to which the coil is to be put. If a flat body or sheet is to be measured, a flat support is provided, and if it is to be used on tubular sheathing such as is placed around an electrical conducting cable for protective purposes, a support 15 such as is shown in Fig. 2 may be provided so that it will ride upon the surface of the tube.

Referring now to the operation of the apparatus, it is first properly adjusted so as to secure a sustained oscillation, the circuit shown being one in which the oscillatory current flows in the resonant circuit consisting of the inductance or variometer 13, the coil 14 and the capacity 8. The measuring coil 14 is included in this circuit so that the oscillation current flows therethrough.

Any movement of the coil 14 over the sheathing of varying thickness will cause a change in the amplitude of the oscillating current. This change in the amplitude of the oscillation current is reflected in the plate circuit of the electron tube 5 as a change in the plate current. This plate circuit includes a suitable indicating apparatus and preferably a milliammeter MA is connected directly in the plate circuit so as to indicate the variations therein, and which variations correspond to variations in the resonant circuit caused by variations in thickness of the metallic plate which is being measured. Thus as the coil 14 is moved over the surface of the metallic plate, variations in thickness are visually indicated by the milliammeter MA. This milliammeter may be scaled in any suitable way, such as for indicating the linear differences in thickness.

In Fig. 2 the invention is shown applied for measuring variations in sheathing as it is being applied to electrical cable as it comes from the extrusion press. Such a cable sheathing extrusion press is disclosed in the copending application of Alfred B. Brown, Serial No. 704,149, filed April 4, 1924, in which the conductors of the cable are fed into the press and then covered with a tubular sheathing of lead by an extrusion process so that the cable as it leaves the press is covered with the lead sheathing.

By applying the measuring apparatus of the present invention to the cable as it leaves the press and applying coil 14 on the cable adjacent to the die block where the cable leaves the press, the operator can readily detect any variations in thickness of the sheath and the heating of the die blocks can be arranged so that when any variation appears the heat on the die block can be adjusted accordingly so that a sheath of uniform thickness will be produced.

Although a particular form of apparatus has been shown applied to a tubular sheathing it is obvious that other arrangements than that shown and described could be employed without departing from the spirit and scope of the appended claims.

What is claimed is:

1. In a measuring apparatus, a tuned grid oscillator circuit having a vacuum tube plate, a grid and filament included therein, means for adjusting said circuit to produce resonance therein, an independently operable measuring coil connected with said circuit with the oscillating current flowing therethrough, a support for said measuring coil shaped to be placed in direct contact with a metallic body, the thickness of which is to be measured, said oscillator circuit varying responsive to variations in thickness of the body as the coil and the support are moved over the surface thereof, and means included in a plate circuit of the vacuum tube responsive to such variations in the oscillator circuit for indicating variations in thickness.

2. In an apparatus for measuring the thickness of metallic bodies including an electron discharge tube oscillator circuit having a grid and filament included therein, means for adjusting said circuit to produce resonance therein, an independently operable measuring coil in circuit therewith subject to said oscillations, a support for said measuring coil shaped to be placed in direct contact with the metallic body whereby there will be a variation of amplitude of the oscillating current according to variations in the thickness of the metallic body, a plate circuit responsive to such variations of the oscillating current, means for negatively biasing the grid, and means connected with the plate circuit responsive to said variations in the plate circuit for visually indicating the variations in thickness.

3. A measuring apparatus for measuring variations in thickness of metallic bodies, comprising an electron discharge tube having filament, grid, and plate elements, an oscillator circuit consisting of a detector coil having a support designed to be placed in direct contact with the metallic bodies, a coil of a variometer for producing resonance, and a condenser in series, a plate circuit including a second coil of the aforementioned variometer, a grid circuit connected to the oscillation circuit between the detector coil and the condenser, and means connected in the plate circuit for indicating variations in thickness of the metallic bodies.

In witness whereof, I hereunto subscribe my name this 22nd day of December, A. D. 1925.

HERMANN ERNEST KRANZ.